(12) United States Patent
Hindman (10) Patent No.: US 9,037,315 B2
(45) Date of Patent: May 19, 2015

(54) AIR VEHICLE CONTROL SYSTEM AND METHOD

(71) Applicant: Raytheon Company, Waltham, MA (US)

(72) Inventor: Richard E Hindman, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 64 days.

(21) Appl. No.: 13/911,160

(22) Filed: Jun. 6, 2013

(65) Prior Publication Data

US 2014/0365035 A1     Dec. 11, 2014

(51) Int. Cl.
*B64C 13/26* (2006.01)
*B64C 13/02* (2006.01)

(52) U.S. Cl.
CPC ............... *B64C 13/26* (2013.01); *B64C 13/02* (2013.01)

(58) Field of Classification Search
CPC .................................. B64C 13/26; B64C 13/02
USPC ............................................................. 701/3
See application file for complete search history.

(56) References Cited

U.S. PATENT DOCUMENTS

| | | | | |
|---|---|---|---|---|
| 5,001,646 A | * | 3/1991 | Caldwell et al. | 701/7 |
| 5,088,658 A | * | 2/1992 | Forsmo | 244/3.21 |
| 5,094,406 A | * | 3/1992 | Shafer | 244/3.21 |
| 6,330,483 B1 | * | 12/2001 | Dailey | 700/28 |
| 6,341,247 B1 | * | 1/2002 | Hreha et al. | 701/3 |
| 8,306,674 B2 | * | 11/2012 | Lam | 701/3 |
| 8,816,260 B2 | * | 8/2014 | Hindman et al. | 244/3.2 |
| 8,818,575 B2 | * | 8/2014 | Lin et al. | 701/3 |
| 2009/0143925 A1 | * | 6/2009 | Lavretsky et al. | 701/3 |
| 2009/0146003 A1 | * | 6/2009 | Sheahan et al. | 244/99.14 |
| 2011/0061043 A1 | * | 3/2011 | Rydh et al. | 717/131 |
| 2011/0066305 A1 | * | 3/2011 | Lin et al. | 701/3 |
| 2011/0082604 A1 | * | 4/2011 | Lam | 701/4 |
| 2011/0180656 A1 | * | 7/2011 | Shue et al. | 244/17.13 |

* cited by examiner

*Primary Examiner* — Mary Cheung
*Assistant Examiner* — Michael Berns
(74) *Attorney, Agent, or Firm* — Renner, Otto, Boisselle & Sklar, LLP (57) ABSTRACT

A control actuation system (CAS) for positioning control effectors of an air vehicle, for steering the air vehicle, includes application of a control allocation matrix to measured positions of the control effectors or their actuators, as part of a feedback mechanism. The output from the control allocation matrix is used as an input for one or more controllers, the output of which is passed through an inverse control allocation matrix, to produce signals that are sent to control actuators to position the control effectors. The controller may use different gains for different of its inputs, for example applying a lower gain for a brake signal than for one or more of a pitch signal, a roll signal, and a yaw signal. The control actuation may make for a control system that is able to better withstand impaired performance or non-performance of some the control effectors.

20 Claims, 6 Drawing Sheets

AIR VEHICLE CONTROL SYSTEM AND METHOD

BACKGROUND OF THE INVENTION

1. Technical Field of the Invention

The invention is in the field of air vehicle control systems and methods.

2. Description of the Related Art

For present four-fin missiles steered by positioning the fins, a control actuation system (CAS) usually consists of four identical actuators, each with an identical independent controller tracking actuator commands. The CAS system includes a feedback mechanism that attempts to drive to zero any errors in the positions of the fins (differences between present fin positions and fin positions corresponding to roll, pitch, and yaw values commanded by an autopilot).

One way of dealing with possible faults in such a system is by detecting faults on individual CAS actuators, and then compensating in some way for any detected faults. This may be achieved by actively reconfiguring a mixing matrix (used for mapping autopilot commands to actuator commands) to transfer authority from a failed actuator to a redundant actuator. These methods require fault detection and active compensation, which increases complexity of a system, and may be inadequate for compensating for a large range of fault conditions.

SUMMARY OF THE INVENTION

A control actuation system (CAS) positions control effectors of an air vehicle using a feedback mechanism that includes application of a control allocation matrix to measured positions of the control effectors or their actuators to produce achieved autopilot commands. This provides advantages such as a more robust fault-tolerant system, and improved response of the system.

According to an aspect of the invention, an air vehicle includes: positionable control effectors; and a control actuation system for positioning the control effectors. The control actuation system includes: actuators operatively coupled to the control effectors; a control allocation matrix that receives input from the actuators and/or the control effectors, and maps the input into roll, pitch, and yaw; an inverse control allocation matrix that maps at least roll, pitch, and yaw, to signals for the actuators; and one or more controllers that receive input from the control allocation matrix, and provide output to the inverse control allocation matrix.

According to another aspect of the invention, a method of air vehicle control includes the steps of: applying a control allocation matrix to positions of control effectors of an air vehicle; using output from the control allocation matrix as an input to one or more controllers, wherein the one or more controllers also receive input from a piloting system of the air vehicle; and applying an inverse control allocation matrix to output from the one or more controllers, to produce signals sent to control actuators to control positioning of the control effectors.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various features of the invention.

DETAILED DESCRIPTION

A control actuation system (CAS) for positioning control effectors of an air vehicle, for steering the air vehicle, includes application of a control allocation matrix to measured positions of the control effectors or their actuators, as part of a feedback mechanism. The output from the control allocation matrix is used as an input for one or more controllers, the output of which is passed through an inverse control allocation matrix, to produce signals that are sent to control actuators to position the control effectors. The controller may use different gains for different of its inputs, for example applying a lower gain for a brake signal than for one or more of a pitch signal, a roll signal, and a yaw signal. The control actuation system may achieve improved response, and may make for a more robust control system that is able to better withstand impaired performance or non-performance of one or more of the control effectors. The control actuation system may be used in any of a variety of types of air vehicles, including missiles, unmanned aerial vehicles (UAVs), and manned winged aircraft. The actuation system may be used with any of a wide variety of positionable control effectors, including aerodynamic surfaces (i.e., fins, canards, rudders, ailerons, flaps, elevators, and elevons) and/or propulsive control devices (i.e. thrust vector control).

Figures 1, 2, 3:
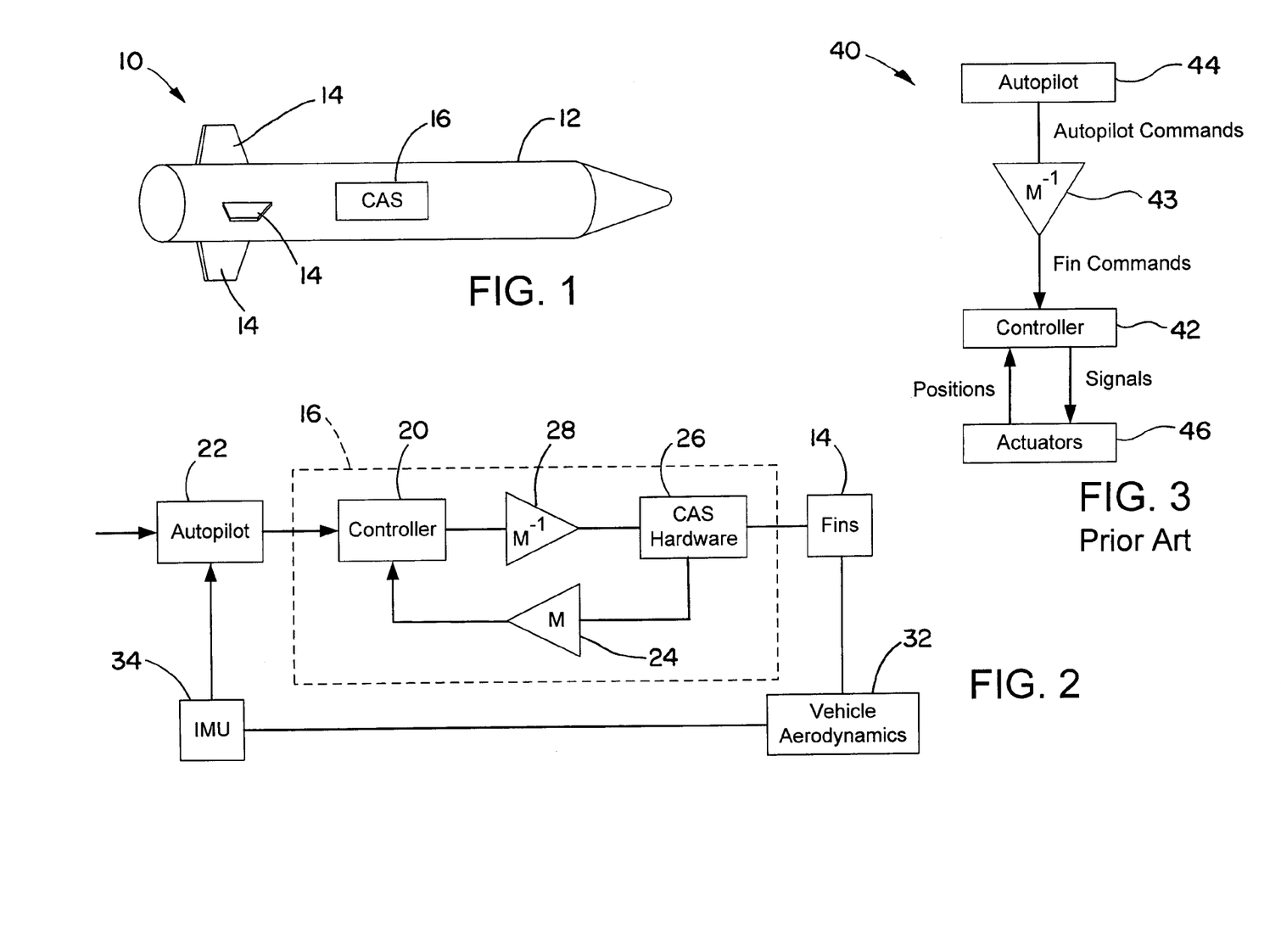
FIG. 1 is an oblique view showing a missile with a control actuation system in accordance with an embodiment of the present invention.
FIG. 2 is block diagram showing parts of the control actuation system of the missile of FIG. 1.
FIG. 3 is a functional block diagram showing operation of a prior art control actuation system.

FIG. 1 shows a maneuverable air vehicle, a missile 10 that includes a fuselage 12 with a series of positionable fins 14. A control actuation system (CAS) 16 is used to position the fins 14, in order to steer the missile 10. Referring to FIG. 2, the control actuation system 16 includes one or more controllers 20 that receive input from an autopilot 22 and a control allocation matrix 24. The autopilot 22 is a piloting system that is involved in steering the missile 10 along a desired course. The autopilot 22 may receive input directly or indirectly from a guidance algorithm, positioning devices (such as a global positioning device (GPS)), and/or sensors or other devices for determining orientation, airspeed, and acceleration (e.g., an inertial measurement unit), to give a few possibilities.

The control allocation matrix 24 is part of a feedback system within the CAS 16. The control allocation matrix 24 receives output from CAS hardware 26, the actuators for positioning or moving the control effectors 14. The CAS hardware 26 may be any of a variety of suitable actuators or positioning devices, including suitable electrical or hydraulic devices. The control allocation matrix 24 receives information on the positions of the actuators, or the corresponding positionable control effectors (the fins 14), and maps the information to the coordinate space of the commands provided by the autopilot 22, for example the roll, pitch, and yaw commands provided by the autopilot 22. In order to make the matrix 24 invertible, an additional command, a brake command, is added to the roll, pitch, and yaw commands. Thus through the control allocation matrix 24 the four positions of the actuators are expressed in roll-pitch-yaw-brake coordinate space. The matrix 24 may be a linear mapping, and may be a static matrix, a matrix in which the parameters (the gains) do not change over time or as conditions change. This use of the control allocation matrix 24 may be represented as follows:

$$[\delta_1^a, \delta_2^a, \delta_3^a, \delta_4^a] \cdot [M] = [\delta_r^a, \delta_p^a, \delta_y^a, \delta_b^a] \quad (1)$$

where $\delta_1^a$, $\delta_2^a$, $\delta_3^a$, and $\delta_4^a$ are the positions of the fins 14 (e.g., as represented by the positions of the actuators that control the position of the fins 14), M is the control allocation matrix 24, and $\delta_r^a$, $\delta_p^a$, $\delta_y^a$, and $\delta_b^a$ are the roll, pitch, yaw, and brake corresponding to the current position of the fins 14. For a four-fin system the control allocation matrix 24 is a 4×4 matrix.

The one or more controllers 20 combine the input from the autopilot 22 and the control allocation matrix 24 to produce an output in terms of commanded desired changes in roll, pitch, yaw, and brake. The controller(s) 20 may make a simple subtraction between the new desired roll, pitch, and yaw for the missile (received from the autopilot 22, with a brake set to zero), and the current roll, pitch, yaw, and brake signals (received from the control allocation matrix 24). This may be represented as:

$$[\delta_r^c, \delta_p^c, \delta hd\ y^c, \delta_b^c] - [\delta_r^a, \delta_p^a, \delta_y^a, \delta_b^a] = [\delta_r^e, \delta_p^e, \delta_y^e, \delta_b^e] \quad (2)$$

where $\delta_r^c$, $\delta_p^c$, and $\delta_y^c$, are the desired (commanded) roll, pitch, and yaw received from the autopilot 22, $\delta_b^c$ is the commanded brake (usually set to zero), and $\delta_r^e$, $\delta_p^e$, $\delta_y^e$, and $\delta_b^e$ are the autopilot command errors. The goal of the system is to drive the autopilot command errors to zero. As an alternative to the relation shown in Equation (2), the one or more controllers 20 may combine the inputs from the autopilot 22 and the control allocation matrix 24 in other suitable ways.

The output from the controller(s) 20 is then passed through a mix matrix 28 that maps the desired changes in roll, pitch, yaw, and brake, into signals for the actuators that control position of the fins 14:

$$[\delta_r^e, \delta_p^e, \delta_y^e, \delta_b^e] \cdot [M^{-1}] = [\delta_1^e, \delta_2^e, \delta_3^e, \delta_4^e] \quad (3)$$

where $M^{-1}$ is the mix matrix 28, and $\delta_1^e$, $\delta_2^e$, $\delta_3^e$, and $\delta_4^e$ are the signals corresponding to the change in positions of the fins 14. The mix matrix 28 is an inverse control allocation matrix. The mix matrix or inverse control allocation matrix 28 may be a linear mapping, and may be a static matrix in which the gains do not change over time as the conditions change. The mix matrix 28 is the inverse of the control allocation matrix 24. The output from the mix matrix 28 is sent to the CAS hardware 26, which produces corresponding movement in the flight control effectors (the fins 14 in the illustrated embodiment).

The positioning of the control effectors (the fins 14) affects the orientation of the missile 10 (FIG. 1) through the action of vehicle aerodynamics 32 of the missile 10. This change in orientation may be detected using an inertial measurement unit (IMU) 34, output of which is provided as an input to the autopilot 22.

The one or more controllers 20, the control allocation matrix 24, and the mix matrix 28 may all be embodied in software that is capable of running on one or more suitable processors or other computing devices. The software for these different features may be individual pieces of software, or alternatively may be multiple pieces of software. One or more processors, circuits, and/or other computing devices may be used to run the software.

The controllers 20 may have different gains for the different channels. For example, the brake signal may have a lower gain than the roll, pitch, and yaw signals. This would result in the system minimizing errors in roll, pitch, and yaw, in preference to reducing errors in brake. This leads to a faster response to the system roll, pitch, and yaw commands, than to brake commands. In systems where all of the gains are the same, the response times will all be similar. In addition the controller 20 may have different gains for different of the roll, pitch, and yaw inputs.

The CAS 16 advantageously attempts to drive to zero differences between the roll, pitch, and yaw of the missile 10, and the autopilot settings (the desired roll, pitch, and yaw). This is in contrast to prior systems that have aimed to drive to zero errors in control surface position of each of the control effectors, the differences between 1) the actual control surface positions, and 2) the positions that would be thought necessary to achieve the roll, pitch, and yaw desired by the autopilot. This difference in operation enables the CAS 16 to be a more robust system, better able to handle hardware performance faults.

FIGS. 3-7 illustrate the ability of the CAS 16 to handle hardware failures (the extreme example of poor hardware performance). FIG. 3 shows a functional block diagram of the operation of a prior art CAS 40, which is configured to produced desired signals for positions of the control effectors (such as the fins 14 of the missile 10), and to drive differences between (errors in) the actuator positions to zero. In the prior art CAS 40 a controller 42 receives input from the inverse mix matrix 43, in the form of fin commands (desired fin positions), which are mapped from the autopilot commands. These fin commands are compared with an input of the present fin positions, to produce signals sent to the individual fin actuators 46, in an attempt to reduce the difference between the desired fin positions and the present fin positions.

Figure 4:
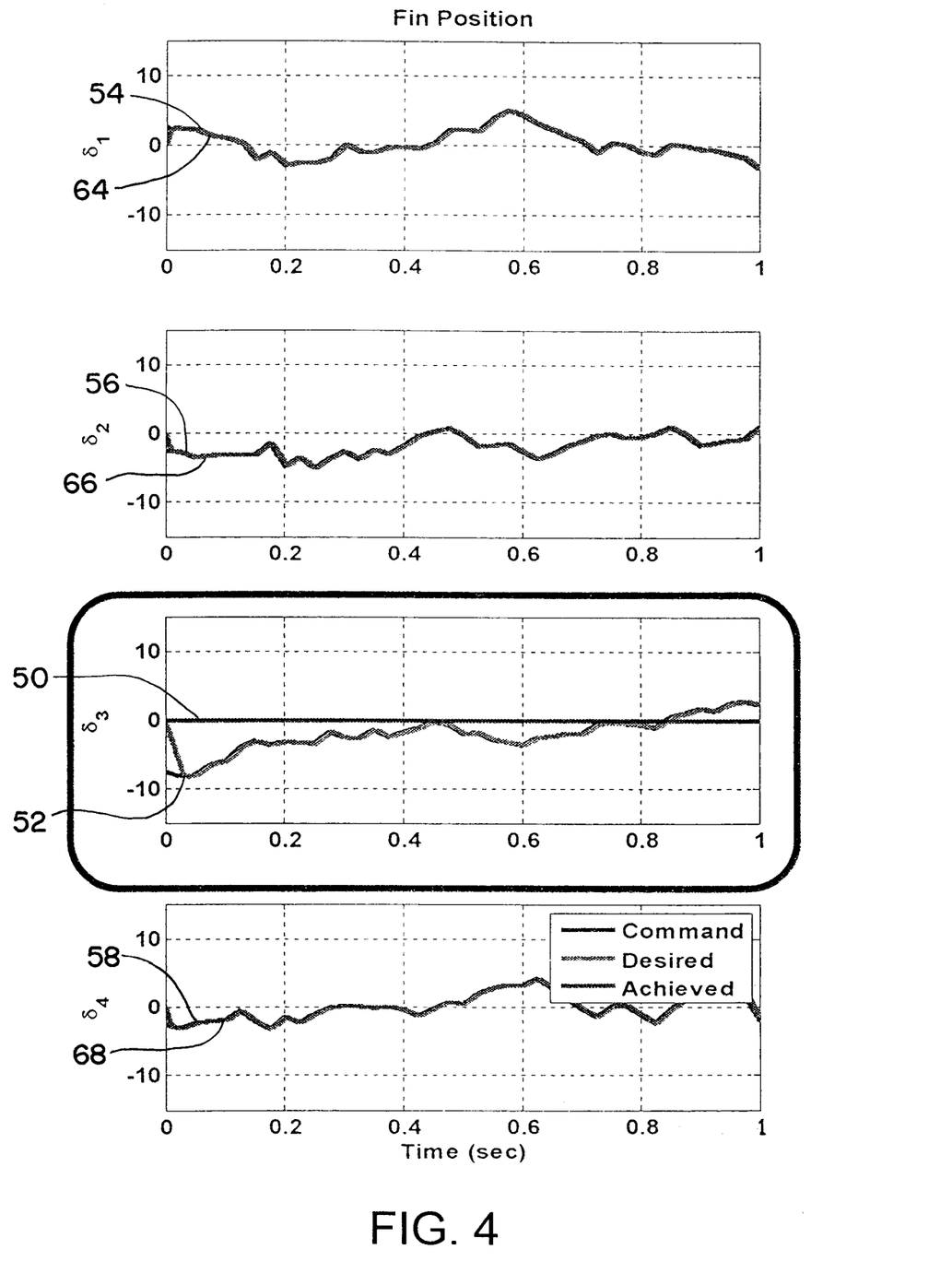
FIG. 4 shows charts of fin commands and achieved fin positions for a sample operation of the control actuation system of FIG. 3.
Figure 5:
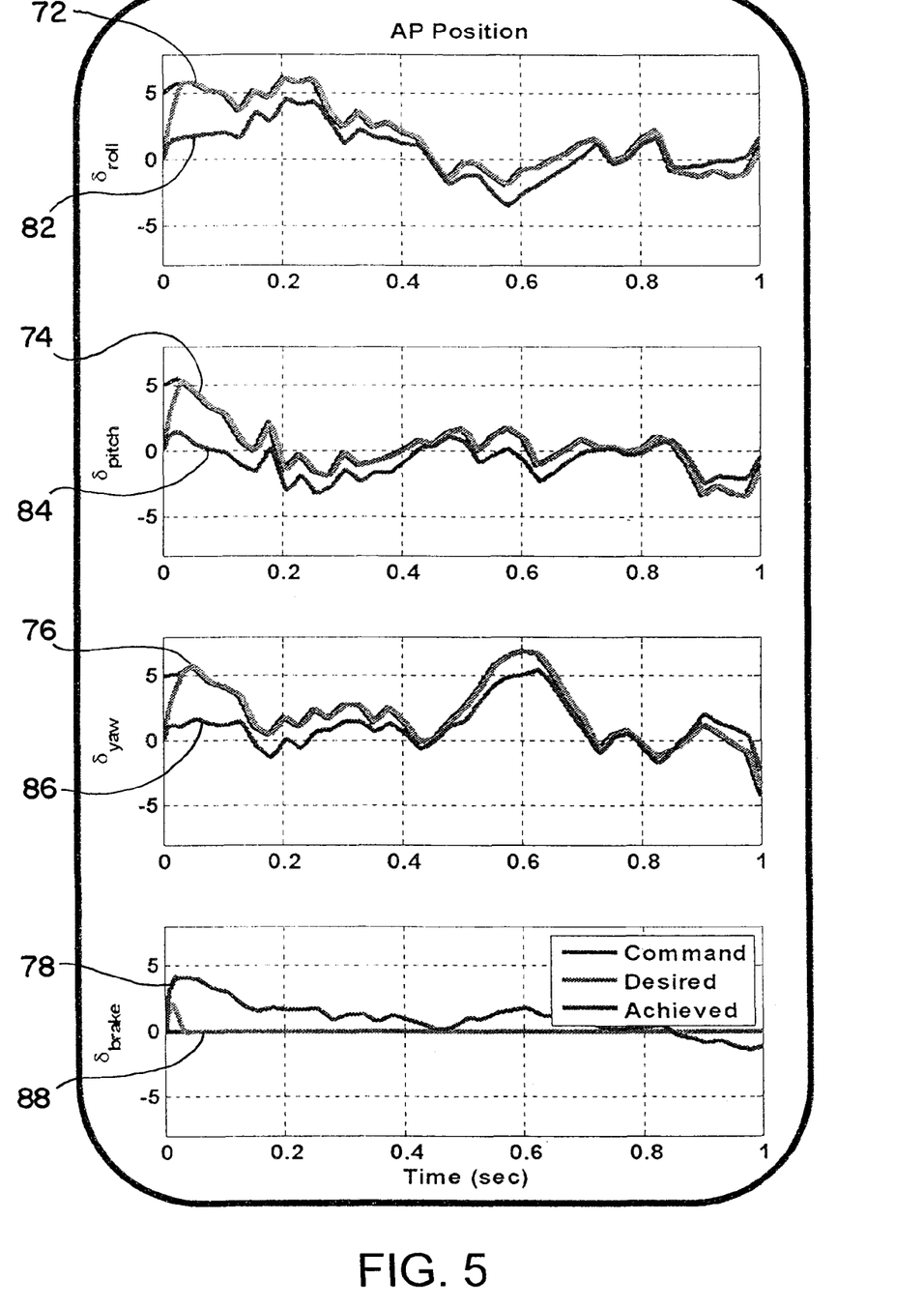
FIG. 5 shows charts of autopilot-commanded and the achieved levels of roll, pitch, yaw, and brake, for the same sample operation illustrated in FIG. 4.

FIGS. 4 and 5 show how this prior art control system performs when one of the control effectors (fin number 3) fails. FIG. 4 shows the fin commands and achieved fin positions received for the four fins of the system, plotted versus time for a typical sample flight profile. FIG. 5 shows the autopilot-commanded and the achieved levels of roll, pitch, yaw, and brake, over the same time period. Note that the fin position for the third fin is fixed at zero, as shown at reference number 50, regardless of the command 52 sent to that fin. This indicates a fault in the neutral position of the fin, with the fin not responding at all to an input signal. The other three fins still respond well to input signals, with the first, second, and fourth fins having respective fin positions 54, 56, and 58 that closely track their respective commanded positions 64, 66, and 68.

The resulting errors between the commanded and achieved levels of roll, pitch, and yaw are shown in FIG. 5. There is significant error between the commanded roll, pitch, yaw, and brake (reference numbers 72, 74, 76, and 78, respectively), and the achieved roll, pitch, yaw, and brake (reference numbers 82, 84, 86, and 88, respectively).

Figure 6:
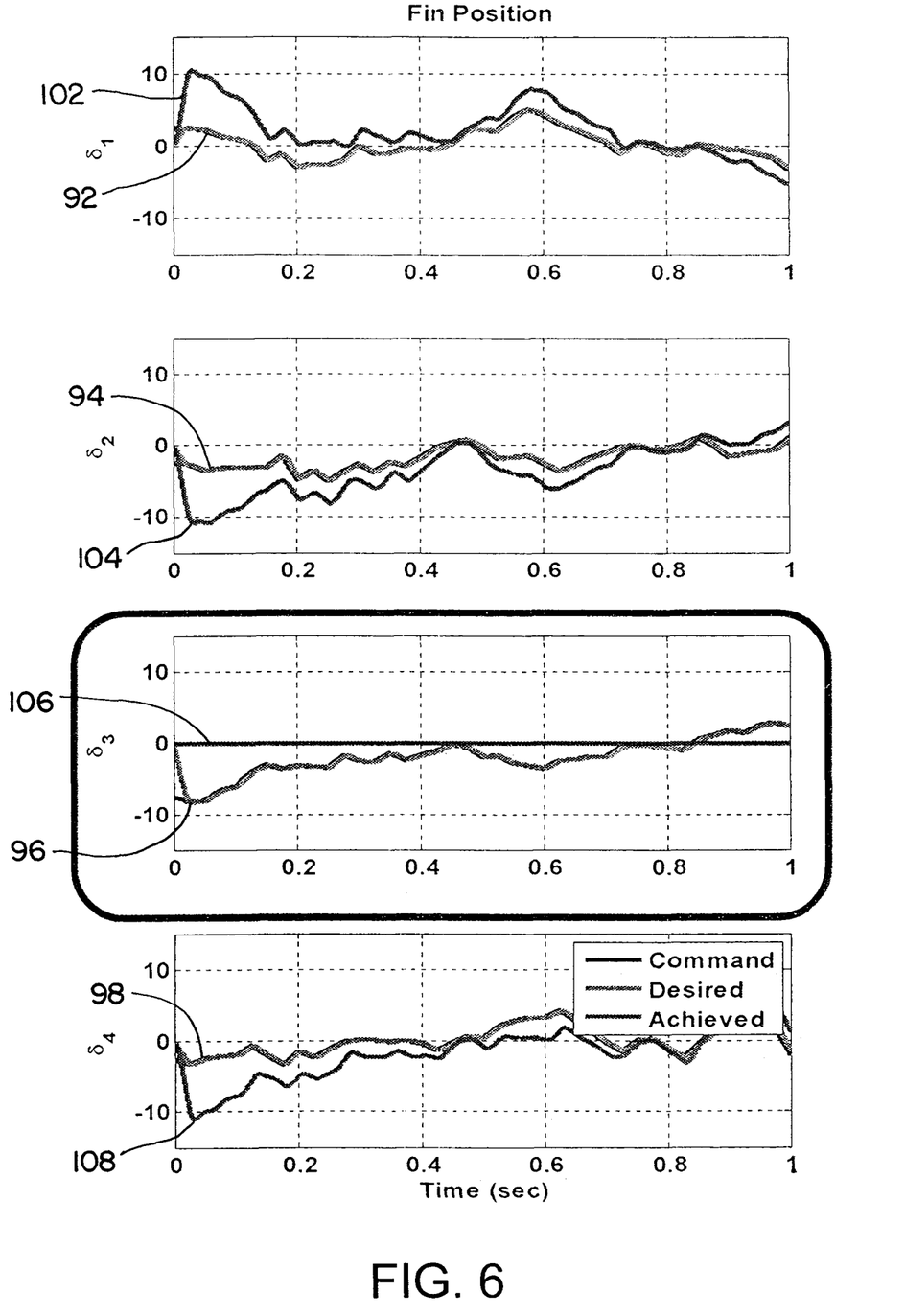
FIG. 6 shows charts of fin commands and achieved fin positions for a sample operation of the control actuation system of FIG. 2.
Figure 7:
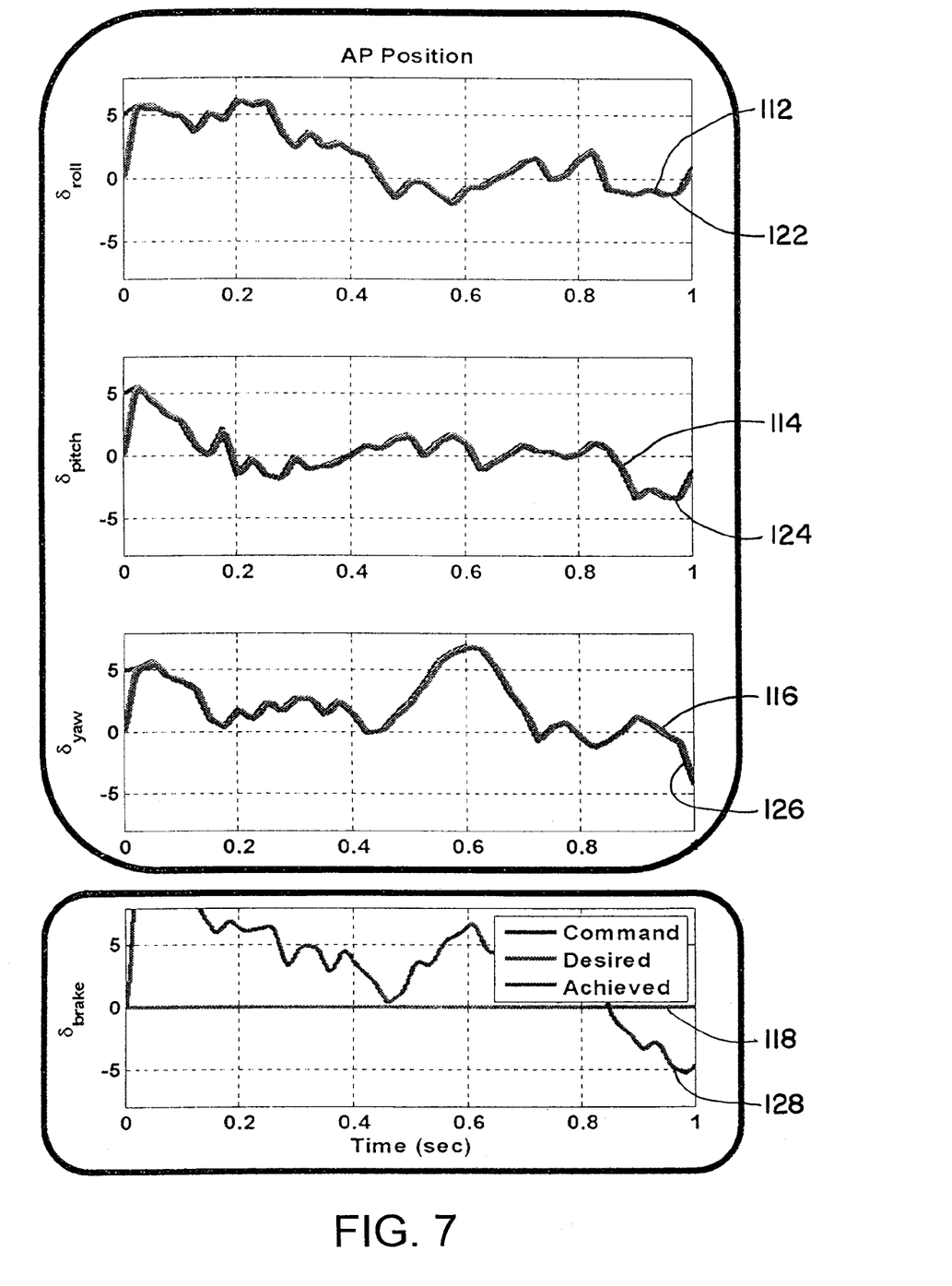
FIG. 7 shows charts of autopilot-commanded and the achieved levels of roll, pitch, yaw, and brake, for the same sample operation illustrated in FIG. 6.

This failure to achieve the commanded roll, pitch, and yaw is contrasted with the ability of the CAS 16 (FIG. 2) to handle the same failure of a fin. FIGS. 6 and 7 show fin desired values and achieved positions, and autopilot (roll, pitch, yaw, and brake) commanded and achieved levels, for the same flight profile that was used in FIGS. 4 and 5, with the same nonresponsive fault condition for the third fin. The fin desired values (reference numbers 92, 94, 96, and 98) are the values that would produce the desired roll, pitch, and yaw, if the fins 14 were all functioning properly. The desired values 92-98 are thus substantially the same as the commands 52 and 64-68 (FIG. 4) for the prior art CAS 40 (FIG. 3). The achieved fin positions (reference numbers 102, 104, 106, and 108) all fail to closely follow the desired values 92-98. The third fin does not move at all, with an actual position 96 pegged at zero, but unlike the situation in FIGS. 3-5 the functioning fins also differ markedly from what their values would be if all the fins were functioning properly. This is contrast with the situation of the prior art CAS 40 (FIG. 3), in which the functioning fins achieve substantially the same positions that would occur if all the fins 14 were operating properly. But although the fin positions 102-108 are all in error, the achieved roll, pitch, and yaw values (reference numbers 112, 114, and 116, respectively, in FIG. 7) closely follow the roll, pitch, and yaw that is desired by the autopilot (reference 122, 124, and 126, respectively). Note that the achieved brake 128 differs markedly from the desired zero brake 118. This result is achieved because the CAS 16 (FIG. 2) attempts to achieve the desired roll, pitch, and yaw values, while allowing the individual fin positions and the brake level to vary from what would be expected in a fully functioning system. This flexibility in operation is achieved without any sort of fault detection mechanism, or alteration of how the system components perform. The ability to compensate for reduced function or non-function of one or more fins (at least to some extent) is a built-in feature of how the CAS 16 is configured.

While the CAS 16 advantageously allows some flexibility in operation, there are limits to recovery from system failures that the CAS 16 is able to handle. For example, if one of the fins 14 were to fail such that it was stuck in a hard-over position at the end of its travel, the CAS 16 would not necessarily be able to still allow the missile 10 to achieve desired flight parameters of roll, pitch, and yaw.

Figure 8:
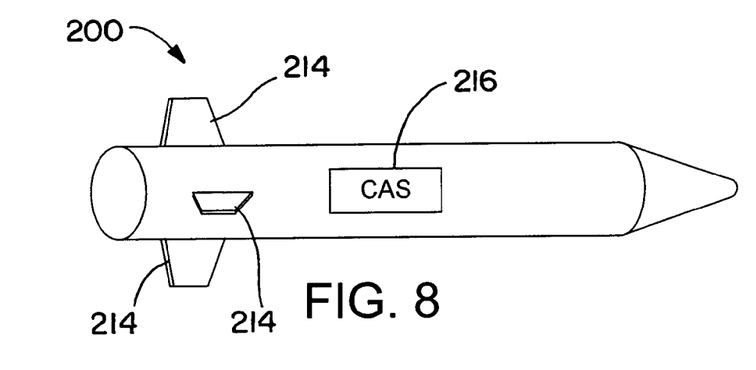
FIG. 8 is an oblique view showing another missile with a control actuation system, in accordance with an alternate embodiment of the present invention.

The CAS 16 (FIG. 2), for use with the missile 10 (FIG. 1), is only one example of many possible control actuation systems, usable with different types of air vehicles. FIG. 8 shows a missile 200 with three fins 214. A suitable control actuation system 216 may control the positioning of the fins 214, using a configuration and method similar to that employed with the missile 10, but without use of the brake signal. Although this reduces somewhat the system's flexibility for handling a non-performing or underperforming fin, it would provide many of the benefits described above with regard to the missile 10.

Figure 9:
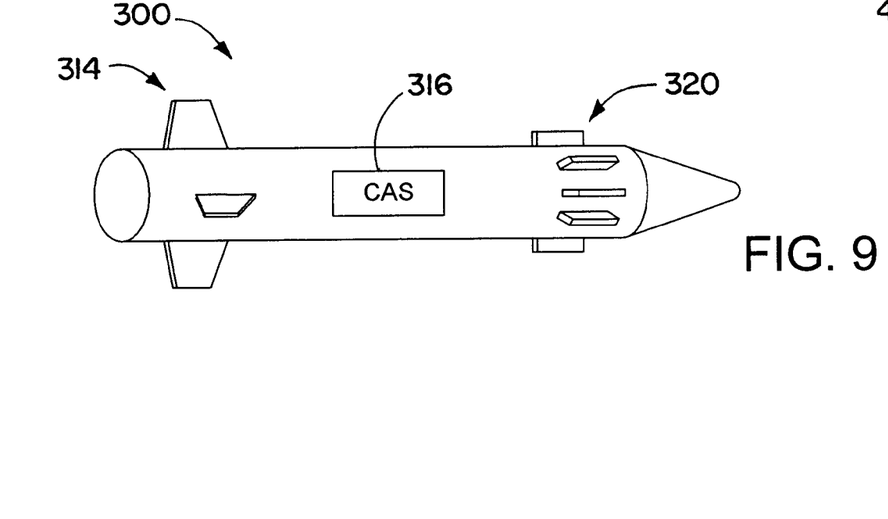
FIG. 9 is an oblique view showing yet another missile with a control actuation system, in accordance with another alternate embodiment of the present invention.

FIG. 9 shows another alternative, a missile 300 having fixed rear fins 314 for stability, and having six movable canards 320 for steering. A collective control actuation system 316 using the above principles (e.g., passing control surface position information through a matrix before combining the information with autopilot input in one or more processors) may be used for controlling positioning of the canards 320, in order to steer the missile 300. More generally, control actuation systems such as those described herein may be used to control any number of control effectors, with multiple brake signals or channels being employed when there are five or more control effectors. As another alternative, a control system as described herein may be employed in controlling multiple types of control effectors, for instance both fins and canards.

Figure 10:
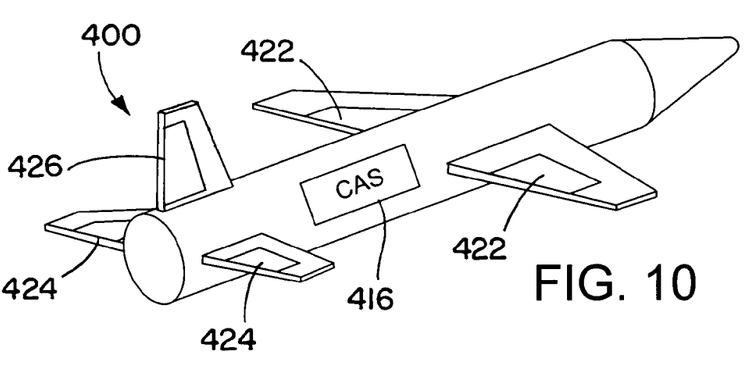
FIG. 10 is an oblique view showing a winged air vehicle with a control actuation system, in accordance with still another alternate embodiment of the present invention.

FIG. 10 shows another embodiment, a winged air vehicle 400 that has a control actuation system 416 for controlling a variety of control effectors, including flaperons 422, elevons 424, and rudders 426. Any of a variety of identical and/or non-identical control effectors may be control by a suitable control actuation system as described herein. Such control effectors may include any of a suitable combination of fins, canards, flaps, ailerons, flaperons, rudders, elevators, elevons, warapable wings, and movable parts thereof, to give a few examples.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An air vehicle comprising:
   positionable control effectors; and
   a control actuation system for positioning the control effectors, wherein the control actuation system includes:
      actuators operatively coupled to the control effectors;
      a control allocation matrix that receives input from the actuators and/or the control effectors, and maps the input into roll, pitch, and yaw;
      an inverse control allocation matrix that maps at least roll, pitch, and yaw, to signals for the actuators; and
      one or more controllers that receive input from the control allocation matrix, and provide output to the inverse control allocation matrix.

2. The air vehicle of claim 1,
   further comprising a piloting system;
   wherein the piloting system outputs to the one or more controllers desired roll, pitch, and yaw for the air vehicle.

3. The air vehicle of claim 1, wherein the inverse control allocation matrix is an inverse of the control allocation matrix.

4. The air vehicle of claim 1, wherein the inverse control allocation matrix also maps one or more brake signals to the signals for the actuators.

5. The air vehicle of claim 4, wherein a gain of the control allocation matrix for the one or more brake signals is lower than gains of the control allocation matrix for the roll, the pitch, and the yaw.

6. The air vehicle of claim 1, wherein the one or more controllers, the control allocation matrix, and the inverse control allocation matrix are all software elements performed on one or more processors of the control allocation system.

7. The air vehicle of claim 1, wherein the positionable control effectors include at least four positionable control effectors.

8. The air vehicle of claim 7, wherein all of the positionable control effectors are all substantially identical.

9. The air vehicle of claim 7, wherein all of the positionable control effectors are aerodynamic control effectors.

10. The air vehicle of claim 1, wherein the air vehicle is a missile.

11. A method of air vehicle control, the method comprising:
    using a control allocation matrix to receive input from actuators and/or control effectors of an air vehicle;
    applying the control allocation matrix to map the input from the actuators and/or control effectors into roll, pitch, and yaw;
    using output from the control allocation matrix as an input to one or more controllers, wherein the one or more controllers also receive input from a piloting system of the air vehicle;
    using an inverse control allocation matrix to receive output from the one or more controllers; and
    applying the inverse control allocation matrix to map at least roll, pitch, and yaw to signals sent to control the actuators to control positioning of the control effectors.

12. The method of claim 11, wherein the applying the inverse control allocation matrix also maps at least one brake signal sent to control the actuators to control position of the control effectors.

13. The method of claim 12, wherein the applying the inverse control allocation matrix includes applying a smaller gain on the at least one brake signal, than on the roll signal, the pitch signal, and the yaw signal.

14. The method of claim 11, wherein the applying the control allocation matrix is a linear mapping of the positions of the control effectors.

15. The method of claim 11, wherein the applying the inverse control allocation matrix is a linear mapping to signals for positioning the control effectors.

16. The method of claim 11, wherein applying the inverse control allocation matrix includes applying a lower gain for one or more of the at least one brake signal, than for one or more of the pitch signal, the roll signal, and the yaw signal.

17. The method of claim 11, further comprising combining the output from the control allocation matrix with input received from an autopilot regarding desired roll, pitch, and yaw for the air vehicle.

18. The method of claim 17, wherein the combining includes taking, in the one or more controllers, a difference between the output from the control allocation matrix and the input received from the autopilot, to produce autopilot command errors at least part of the output from the one or more controllers.

19. The method of claim 11, wherein the control effectors include three or more identical control effectors.

20. The method of claim 11, wherein the control effectors include four or more identical control effectors.

* * * * *